No. 894,696. PATENTED JULY 28, 1908.
F. B. RENNICK.
DOUBLE ACTING CORN POPPER.
APPLICATION FILED APR. 17, 1908.
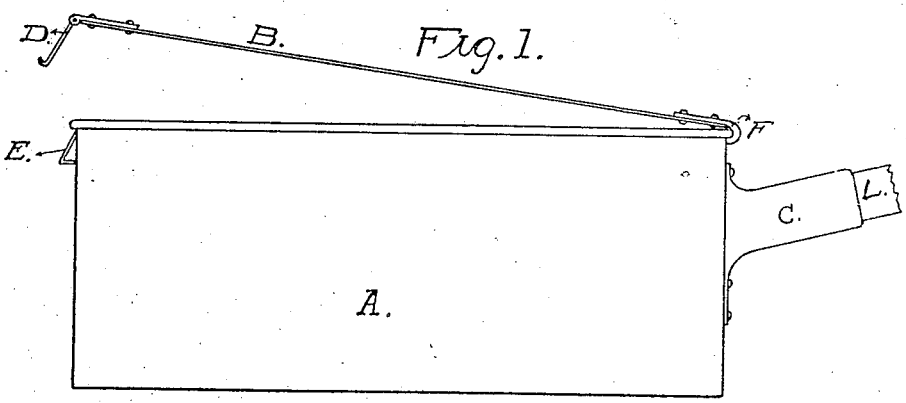
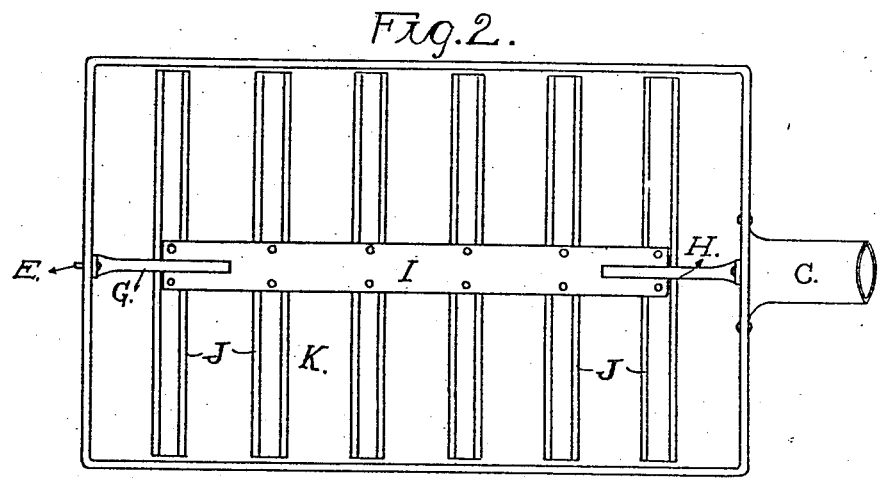
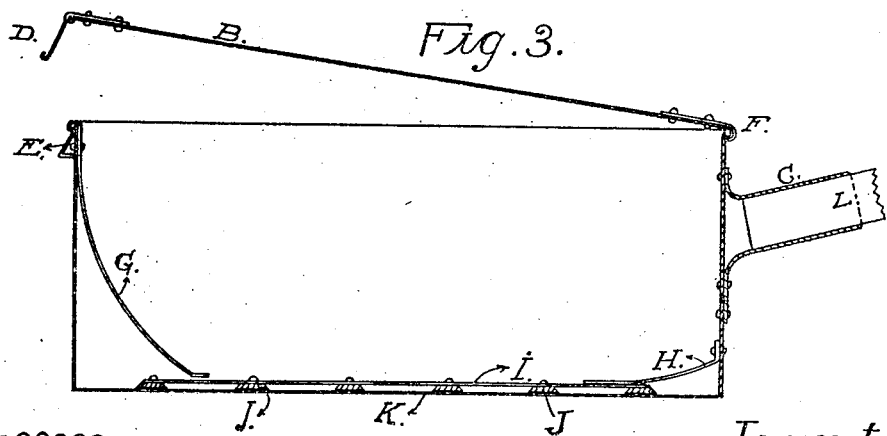
Witnesses.
Inventor.

UNITED STATES PATENT OFFICE.

FRANK B. RENNICK, OF ASHTABULA, OHIO.

DOUBLE-ACTING CORN-POPPER.

No. 894,696.  Specification of Letters Patent.  Patented July 28, 1908.

Application filed April 17, 1908. Serial No. 427,575.

*To all whom it may concern:*

Be it known that I, FRANK B. RENNICK, a citizen of the United States, residing at Ashtabula, in the county of Ashtabula and State of Ohio, have invented certain new and useful Improvements in Double-Acting Corn-Poppers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in double-acting corn poppers and the object in view is to produce a simple and efficient device of this nature having a shaker grate mounted to move backward and forward upon the bottom of the popper by the momentum of the latter.

The invention comprises various details of construction, combinations and arrangements of parts which will be hereinafter fully described and then specifically defined in the appended claims.

My invention is illustrated in the accompanying drawings, in which:—

Figure 1 is a side elevation of my improved double-acting popper. Fig. 2 is a top plan view, and Fig. 3 is a longitudinal sectional view through the device.

Reference now being had to the details of the drawings by letter, A designates the popper made preferably of any suitable metal and having a socket portion C for the reception of the handle L.

B is a cover having a hook F at one end designed to fit over a beading at the rear end of the popper while the forward end is provided with a latch D for engagement with a catch E. Mounted at the forward end of the popper and secured to the end wall thereof is a spring arm G, the lower end of which is free and is bent in a horizontal position and adapted to serve as a guide for the reciprocating shaker grate. To the rear end of the popper is fastened a similar arm H to coöperate with the arm G to guide the reciprocating shaker grate. Said shaker grate comprises several flat cross pieces J, having their opposite longitudinal edges beveled and secured to a central strip I, as shown clearly in Fig. 2 of the drawings. Said cross-pieces J are adapted to rest flat upon the bottom of the popper and the strip I is held in place by means of the arms G and H allowing the shaker grate to move back and forth under the momentum of the shaking of the popper, thus keeping the kernels of corn stirred up which would prevent their burning before the kernels pop.

From the foregoing, it will be noted that, by the provision of a double-acting popper as shown and described, a simple and efficient means is afforded whereby, as an operator shakes the popper, the kernels may be thoroughly agitated, and new kernels are presented to the hot surface thereby preventing burning or scorching of the corn before being popped.

What I claim to be new is:—

1. A double-acting popper comprising a receptacle, arms fixed to the ends thereof and turned toward each other and serving as guides, a shaker grate resting upon the bottom of the receptacle and adapted to be guided by said arms as the grate moves back and forth, as set forth.

2. A double-acting corn popper comprising a receptacle, arms fixed to the ends thereof and projecting toward each other, their lower portions horizontally disposed and spaced apart from the bottom of the receptacle, a shaker grate made up of a series of cross-pieces, a strip connecting said pieces and holding the same spaced apart, said strip being positioned underneath the ends of said guide arms, as set forth.

3. A double-acting corn popper comprising a receptacle, arms fixed to the ends thereof and projecting toward each other, their lower portions horizontally disposed and spaced apart from the bottom of the receptacle, a shaker grate made up of a series of cross-pieces, a strip connecting said pieces and holding the same spaced apart, said strip being positioned underneath the ends of said guide arms, the opposite longitudinal edges of said cross-pieces being beveled, as set forth.

In testimony whereof I hereunto affix my signature in the presence of two witnesses.

FRANK B. RENNICK.

Witnesses:
WILLIAM M. HOOSE,
WM. CHRISTENSEN.